United States Patent
Cawlfield et al.

[11] Patent Number: 5,254,227
[45] Date of Patent: Oct. 19, 1993

[54] PROCESS FOR REMOVING CATALYST IMPURITIES FROM POLYOLS

[75] Inventors: David W. Cawlfield; Jerry J. Kaczur, both of Cleveland, Tenn.; Hassan Arabghani, Wilton, Conn.

[73] Assignee: Olin Corporation, Cheshire, Conn.

[21] Appl. No.: 793,088

[22] Filed: Nov. 15, 1991

Related U.S. Application Data

[63] Continuation-in-part of Ser. No. 366,996, Jun. 16, 1989, abandoned.

[51] Int. Cl.$^5$ .............................................. C25F 5/00
[52] U.S. Cl. .................... 204/131; 204/182.4; 204/188; 204/190; 204/136
[58] Field of Search ............... 204/182.4, 188, 190, 204/136, 131, 138

[56] References Cited

U.S. PATENT DOCUMENTS

| | | | |
|---|---|---|---|
| 2,815,320 | 12/1957 | Kollsman | 204/182.4 |
| 3,291,713 | 12/1966 | Parsi | 204/182.4 |
| 3,330,750 | 7/1967 | McRae et al. | 204/182.4 |
| 3,528,920 | 9/1970 | Nitzeki et al. | 252/73 |
| 3,582,491 | 6/1971 | Louvar et al. | 204/186 |
| 3,704,218 | 11/1972 | Kato et al. | 204/182.4 |
| 3,705,846 | 12/1972 | Kato et al. | 204/182.4 |
| 4,082,835 | 4/1978 | Chlanda et al. | 423/242 |
| 4,355,188 | 10/1982 | Herold et al. | 568/620 |
| 4,552,635 | 11/1985 | Jenczeski et al. | 204/182.4 |
| 4,608,141 | 8/1986 | Chlanda et al. | 204/182.5 |
| 4,629,545 | 12/1986 | Mani et al. | 204/182.4 |
| 4,632,745 | 12/1986 | Giuffrida et al. | 204/301 |
| 4,687,561 | 8/1987 | Kunz | 204/182.5 |

FOREIGN PATENT DOCUMENTS

| | | |
|---|---|---|
| 51-23211 | 2/1976 | Japan . |
| 54624 | 3/1969 | Poland . |
| 62214 | 3/1971 | Poland . |

Primary Examiner—John Niebling
Assistant Examiner—Arun S. Phasge
Attorney, Agent, or Firm—James B. Haglind; F. A. Iskander

[57] ABSTRACT

A process for removing an ionic impurity from an impure substantially non-aqueous liquid passes the impure non-aqueous liquid through at least one ion exchange compartment containing an ion exchange medium. The ion exchange compartment is separated from an anode compartment and a cathode compartment by ion exchange membranes, where the ion exchange membranes and ion exchange medium having functional groups of the opposite charge as that of the ionic impurity. An electric current is conducted across the ion exchange compartment substantially transverse to the direction of flow of the impure non-aqueous liquid, and transporting the ionic impurity through an ion exchange membrane to separate the ionic impurity from the non-aqueous liquid.

25 Claims, 3 Drawing Sheets

PROCESS FOR REMOVING CATALYST IMPURITIES FROM POLYOLS

This application is a continuation-in-part application of U.S. Ser. No. 07/366,996, filed on Jun. 16, 1989, now abandoned.

BACKGROUND OF THE INVENTION

This invention relates to a process for purifying non-aqueous fluids. More particularly, this invention relates to the removal of ionizable impurities from non-aqueous liquids.

Separations of small quantities of acid and basic gases from neutral gases are frequently performed in industry. Examples of these separations include removal of hydrogen sulfide from natural gas, and other fuel or process gas streams; cleanup of waste gas streams containing oxides of sulfur and nitrogen; and recovery of ammonia from waste gases of industrial or agricultural sources. Similarly the recovery of catalysts and removal of ionic impurities from organic liquid products and solvents is widely practiced.

Methods presently used in the art for gas purification include the use of selective liquids and absorbent solids with affinity for acids or bases that are contacted with the feed gas. The efficient contacting of the liquid with the gas and the recovery of the absorbed acid or basic gas are significant process problems requiring the application of energy and equipment in multiple process steps. Other processes use high pressure and selective membranes to separate the gases by diffusion through the membrane. These processes have a removal efficiency dependent on the pressure difference across the membrane. Therefore, efficient separation and recovery of low levels of gaseous impurities is not economically attractive.

Similarly, methods for the removal of ionizable impurities from non-aqueous liquids suffer from the same shortcomings as those used in gas purification.

Present commercial practices for the removal of catalyst and other impurities from polyols include the following:

Nitzeki et al, in U.S. Pat. No. 3,528,920, published Sep. 15, 1970, describe the use of synthetic magnesium silicate as an adsorbent for the removal of an alkaline catalyst from glycol ethers. However, the method requires the neutralization of the alkaline catalyst acid prior to filtration.

The removal of inorganic catalysts from polyols using an electrostatic precipitator is described in U.S. Pat. No. 3,582,491, published Jun. 1, 1971, by J. F. Louvar et al. A mixture of polyol, water and a solvent which is immiscible in water and having a density substantially different from water is formed. The solvent is employed in an amount sufficient to adjust the density differential between the polyether-solvent solution and water to at least 0.03 gram per milliliter. The polyether-solvent solution is then separated from the water by electrostatic coalescence. A stream of water containing water-soluble impurities and a stream of containing polyether-solvent solution are separately recovered after the precipitation, followed by separating the solvent from the polyether-solvent solution. This method is not attractive due to high processing costs.

Ion exchange techniques have also been employed for removal of the catalyst from polyols. In this technique, the crude polyol, mixed with water and or an organic solvent, is passed through a column packed with ion exchange resin to remove the ionic impurities. However, few types of resins can produce polyols having ionic impurities at less than about 5 parts per million and having acceptable color.

The use of ion exchange resins are described in Polish patent Nos. 54624 and 62214 published Mar. 8, 1969 and Mar. 20, 1971 respectively, by T. Sniezik et al to remove catalysts from polyether polyols. For basic catalysts such as potassium hydroxide, a highly acidic cation exchange resin is used. The purification process rate is dependent on the temperature and the molecular weight of the polyether. The polyol is removed from the ion exchange resin by washing with water, preferably containing a non-ionic surfactant. The ion exchange resin is then regenerated with acid or alkali.

Japanese patent publication No. 51-23211, published Feb. 24, 1976 by Y. Uchiyama refines alkoxylates of alcohols or polyalkylene glycols containing alkali catalysts by passing the alkoxylate through a type H regenerated cation exchange resin.

These processes are time consuming as they require low flow rates of the order of 1 bed volume per hour. Further, the processes have waste disposal problems associated with the regeneration process. When used with an organic solvent, ion exchange is costly as solvent stripping is required along with frequent resin regeneration.

SUMMARY OF THE INVENTION

It is an object of this invention to provide a process for removing an ionizable impurity from non-aqueous liquids in a single step process.

Another object of the invention is to to provide a process for removing an ionizable impurity without the use of organic solvents.

A further object of the invention is to provide a process for removing an ionizable impurity which can be operated at increased flow rates.

An additional object of the invention is to provide a process for removing an ionizable impurity which will efficiently reduce the concentration of the impurity to levels of less than 10 ppm.

A still further object of the invention is to provide a process for removing an ionizable impurity that is easy to control, energy efficient, and does not require the use of high compression.

Yet another object of the invention is to provide a process for removing an ionizable impurity which is free of solids handling and which produces no solid wastes.

These and other objects of the invention are accomplished in a process for removing an ionic impurity from an Impure non-aqueous liquid which comprises:

a) passing the impure non-aqueous liquid through at least one ion exchange compartment, the ion exchange compartment being separated from an anode compartment and a cathode compartment by ion exchange membranes, the ion exchange membranes having functional groups of the same charge as that of the ionic impurity, b) conducting an electric current across the ion exchange compartment substantially transverse to the direction of flow of the impure non-aqueous liquid, and c) transporting the ionic impurity through an ion exchange membrane into the cathode compartment to separate the ionic impurity from the non-aqueous liquid.

BRIEF DESCRIPTION OF THE DRAWINGS

More in detail, the novel process of the present invention is carried out in a reactor such as that illustrated by the FIGURES.

FIG. 1 shows an electrolytic cell 10 having cathode compartment 12, ion exchange compartment 20, and anode compartment 30. Cathode compartment 12 includes cathode 13, catholyte 15, and ion exchange medium 17. Cathode compartment 12 is separated from ion exchange compartment 20 by ion exchange membrane 19. Ion exchange compartment 20 includes ion exchange medium 23 and is separated from anode compartment 30 by ion exchange membrane 27. Anode compartment 30 includes anolyte 33, anode 35, and ion exchange medium 37.

In FIG. 2, electrolytic cell 10 has been expanded to include a second ion exchange compartment 40 which is positioned between anode compartment 30 and ion exchange compartment 20. Ion exchange compartment 40 includes ion exchange medium 43. Ion exchange membrane 42 separates ion exchange compartment 40 from ion exchange compartment 20. The polyol feed solution enters the lower part of ion exchange compartment 20, flows upward and out of ion exchange compartment 20 and is fed into the lower part of ion exchange compartment 40. The purified polyol product solution is recovered from the upper part of ion exchange compartment 40.

The flow direction in the ion exchange compartments can also be altered, for example, with the solution from the top of ion exchange compartment 20 being fed to the top of ion exchange compartment 40. The product solution then exits from the bottom of ion exchange compartment 40.

Figure 3:
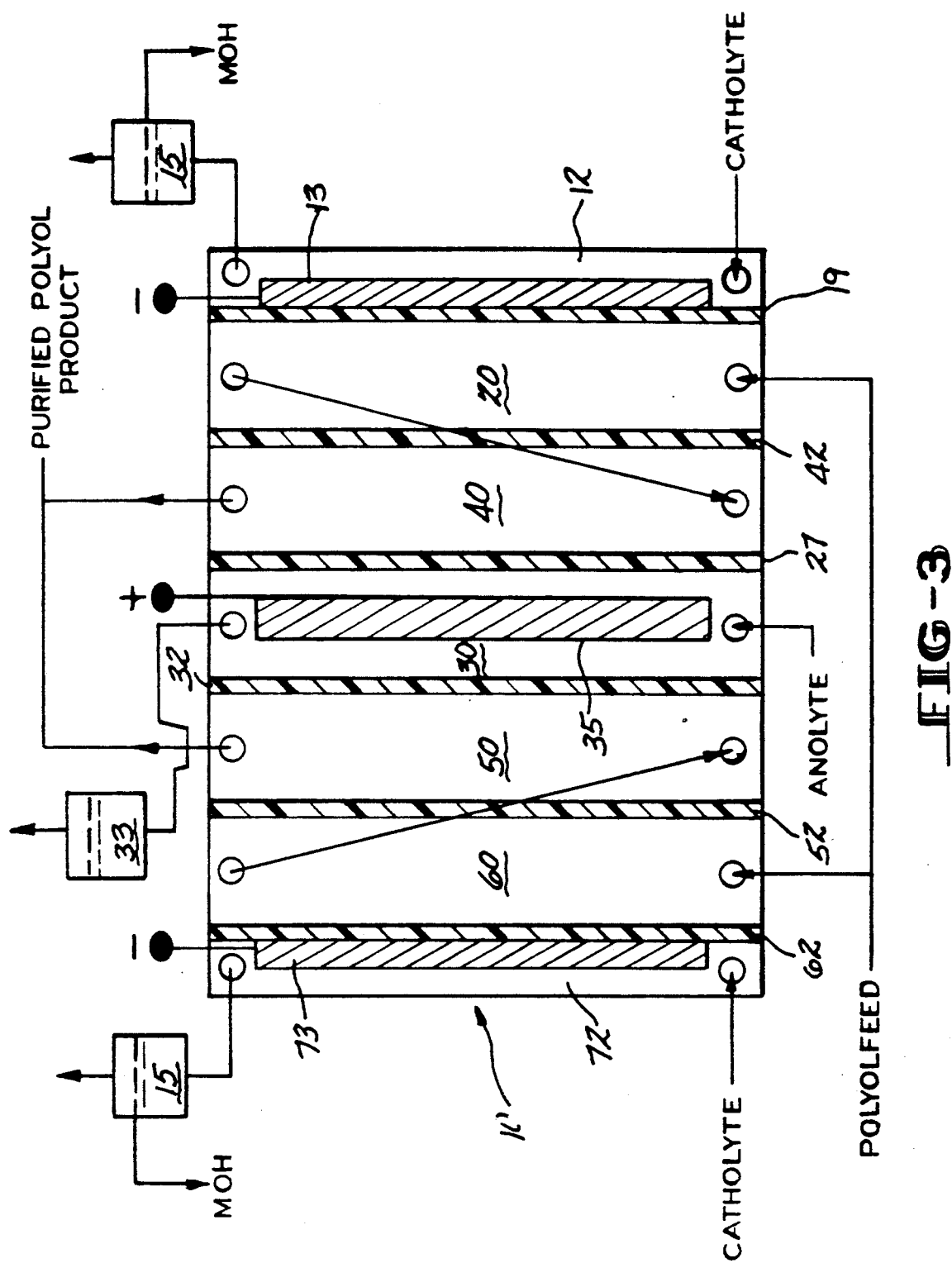
FIG. 3 is a sectional side elevational view of an additional electrolytic cell which can be employed in the novel process of the invention.

FIG. 3 depicts electrolytic cell 10 having first cathode compartment 12. Cathode compartment 12 includes cathode 13 and catholyte 15. Cathode compartment 12 is separated from ion exchange compartment 20 by ion exchange membrane 19. Ion exchange compartment 20 is separated from ion exchange compartment 40 by ion exchange membrane 42. Ion exchange compartment 40 is adjacent to and separated from anode compartment 30 by ion exchange membrane 27. Anode compartment 30 includes anolyte 33 and anode 35 and is separated from ion exchange compartment 50 by ion exchange membrane 32. Ion exchange compartment 50 is separated from ion exchange compartment 60 by ion exchange membrane 52. Ion exchange compartment 60 is adjacent to and separated from second cathode compartment 72 by ion exchange membrane 62. Cathode 73 is included in second cathode compartment 72.

DETAILED DESCRIPTION OF THE INVENTION

The novel process of the present invention removes ionizable impurities from non-aqueous liquids. Non-aqueous liquids are those in which water is not the continuous phase and include organic compounds, oils, and water-in-oil emulsions among others. The liquids which can be purified include those which are commercial products as well as effluents from which the removal of ionizable impurities is desired before re-use or disposal.

Liquids which can be treated by the process include polyhydroxy compounds such as polyhydric alcohols, polyester polyols and polyether polyols; commercial organic solvents such as aliphatic hydrocarbons having greater than about 5 carbon atoms, halogenated hydrocarbons, and aromatic hydrocarbons; functional fluids as exemplified by hydraulic fluids, cutting fluids, cooling fluids, rolling fluids, brake fluids, and transmission fluids, many of which include polyol as a major component.

A preferred embodiment of a non-aqueous liquid is a polyol which is a product of the reaction of an alkylene oxide with an initiator containing at least two active hydrogen atoms including water, alcohols, amines, amides, acids, and the like, in the presence of a catalyst. A variety of products can be manufactured by varying the alkylene oxide, the type of initiator, and the operating conditions. Alkylene oxides (1,2-oxides) which may be employed include those containing between about 2 to about 8 carbon atoms, such as ethylene oxide, propylene oxide, butylene oxide, styrene oxide, glycidol, mixtures thereof and the like, with a polyhydric alcohol such as sugar alcohol, glycerine, or a polyalkylene glycol.

Of the polyols, polyether polyols are preferred which may be formed by known methods which react an aliphatic polyhydric alcohol or compound with a single alkylene 1,2-oxide or a mixture of two or more of the 1,2-oxides. If desired, the alcohol may be first oxyalkylated with one 1,2-oxide, followed by oxyalkylation with a different 1,2-oxide or a mixture of 1,2-oxides. If desired, the resulting oxyalkylated alcohol then can be further oxyalkylated with a still different 1,2-oxide. For convenience, the term "mixture" when applied to a polyether polyol containing a mixture of 1,2-oxides, is intended to include both random and/or block polyethers such as:

(1) Random addition obtained by simultaneously reacting two or more 1,2-oxides with the polyhydric compound.

(2) Block addition in which the polyhydric compound is first reacted with one 1,2-oxide and then reacted with a second 1,2-oxide.

(3) Block addition followed by random addition or an additional block of 1,2-oxide. Any suitable ratio of different 1,2-oxides may be employed.

Aliphatic polyhydric alcohol reactants in the polyether polyol are those containing between 2 and about 6 hydroxyl groups and between 2 and about 8 carbon atoms per molecule, as illustrated by compounds such as the following: ethylene glycol, propylene glycol, 2,3-butylene glycol, 1,3-butylene glycol, 1,5-pentanediol, 1,6-hexanediol, glycerol, trimethylolpropane, sorbitol, pentaerythritol, mixtures thereof and the like. In addition, cyclic aliphatic polyhydric compounds such as starch, glucose, sucrose, methyl glucoside and the like may also be employed in the preparation of the polyether polyol.

Each of the aforesaid polyhydric compounds and alcohols can be oxyalkylated with ethylene oxide, propylene oxide, butylene oxide, cyclohexene oxide, glycidol, or mixtures thereof.

The process of the present invention is preferably applied to any of the commonly available polyether polyols based on ethylene, propylene, butylene oxide and mixtures thereof which are not completely miscible with water (i.e., form an emulsion after the addition of water to the crude polyether). Short-chained polyethers (molecular weight of about 300) which contain no ethylene oxide; polyethers of medium molecular weight (about 4,000) which contain less than about 20 percent of ethylene oxide and polyethers of relatively high molecular weight (about 20,000) which contain less than about 40 percent of ethylene oxide are particularly suitable.

Polyether polyols may be used as lubricants, heat transfer fluids, hydraulic fluids, surface active agents, and the like, as well as a reactant in the preparation of polyurethane foams.

Catalysts used in the preparation of the polyether polyol are generally alkali metal compounds such as alkali metal hydroxides and alkali metal alkoxides where the alkoxide group contains from 1 to about 5 carbon atoms. Examples of alkali metal hydroxides include sodium hydroxide and potassium hydroxide, as well as the hydroxides of lithium, rubidium and cesium. Illustrative of the alkali metal alkoxides are sodium methoxide, potassium methoxide, sodium propoxide, potassium isopropoxide, sodium t-butoxide, and potassium butoxide among others. In addition alkali metal derivatives of polyhydroxy compounds such as ethylene glycol or glycerol as well as sodium or potassium salts of polyols may be used as catalysts.

Other catalysts which may be employed in the preparation of such polyethers and which may be removed by the instant process include quaternary ammonium bases and well-known acid catalysts.

The acid catalyst may be any inorganic or Lewis acid catalyst. Representative Lewis acid catalysts include, but are not limited to, boron trifluoride etherate, aluminum trichloride, ferric chloride, stannic chloride, zinc chloride, cobalt chloride, titanium tetrachloride, etc., and mixtures thereof. Other suitable acid catalysts include inorganic acids such as sulfuric acid, phosphoric acid, hydrochloric acid, hydrofluoric acid, nitric acid and the like.

Preferred as catalysts are alkali metal compounds such as alkali metal hydroxides and alkali metal alkoxides, with alkali metal hydroxides being particularly preferred. Of the alkali metal hydroxides, sodium hydroxide, potassium hydroxide, and mixtures thereof are preferred, with potassium hydroxide being particularly preferred.

The catalyst concentration as an impurity in crude polyols in commercial polyol processes is generally in the range of from about 500 to about 5000, and more usually between 1000 and 3000 parts per million of polyol.

Various solvents and solvent mixtures can also be used in the polyol purification process. Water is the preferred solvent since it is non-hazardous and easily stripped from the purified polyol product. However, for higher viscosity polyols and EO-capped polyols, mixtures of water and a solvent or solvents are useful for reducing viscosity and preventing a water-polyol gelling effect from occurring. Suitable solvents in conjunction with water may be isopropanol, isobutanol, toluene, hexane, and methanol among others.

Where the impurity in the polyol is ionizable but not in ionic form, an aqueous liquid such as water or a mixture of water and a solvent or chemical additive is added to the polyol in amounts sufficient to convert the impurity to ions but insufficient to form a continuous aqueous phase.

A minimum amount of water is also necessary for the ion exchange resin to be electrically conductive. In addition, the water in the ion exchange membrane or ion exchange medium, where used can be absorbed into the polyol phase if there is too little water in the polyol feed or if the polyol phase is too hydrophilic. Suitable concentrations of water in the polyol range, for example, from about 1 to about 40%, and preferably from about 2 to about 15% by weight.

The crude non-aqueous polyol to be treated by the process of the invention is fed to the ion exchange compartment. The ion exchange compartment may contain an ion exchange medium such as an ion exchange resin having suitable groups for reacting with and adsorbing the ionic impurity.

The nature of the ionic impurity to be removed is instrumental in determining the choice of ion exchange medium and ion exchange membranes. An anionic medium and anionic exchange membranes are used where the ionic impurity is an anion, and a cationic mediium and cationic membranes being employed where the impurity is a cation. Suitable ion exchange mediums and membranes have as anionic functional groups, hydroxyl, quaternary amine (or ammonium), primary amino ($-NH_2$), secondary amino ($-NHR$), tertiary amino ($-NR_2$) and phosphonium groups among others. Cationic functional groups which may be present in the ion exchange medium and membranes include carboxylic acid, sulfonic or sulfuric acid, acids of phosphorus such as phosphonous, phosphonic and phosphoric, among others.

The ion exchange mediums are suitably conductive so that a practical amount of current can be passed through the separation cell. When alkaline or basic impurities such as alkali metal hydroxides are to be removed from the polyol, strongly acidic cation exchange resins in the hydrogen form are preferred for use as the ion exchange mediums. Examples include low crosslinked, strong acid cation ion exchange resins such as the Rohm and Haas Amberlite TM IR-118 and higher crosslinked IR-120+ are suitable for use. Preferred are the gel-type strong acid type ion exchange resins (H form) which are polystyrene based with divinyl benzene (DVB) crosslinking for support. High surface area macroreticular or macroporous type ion exchange resins are also suitable so long as the crosslinking is low (about 5%) and suitably conductive for use in the separation cell as exemplified by Rohm & Haas Amberlyst TM -19 and Amberlyst TM -31 as well as Mitsubishi Diaion ® cation resins.

The preferred form of ion exchange medium is a bead type, although other forms may be used so long as they can be packed into the compartment. The smaller size ion exchange resins have a greater equilibrium absorption rate for the cation catalyst ions, but they also have a greater pressure drop per unit flow. Other ion exchange forms include rods, or a cast form of ion exchanger mass with internal flow channels.

To recover the ionic impurity from the ion exchange medium, an electric current is passed between an anode and a cathode across the ion exchange medium. The current is preferably conducted across the ion exchange medium transverse to the direction of flow of the non-conductive fluid through the ion exchange medium. The electric current induces migration of the ionic impurity towards the electrode of opposite polarity.

Suitable cell operating currents are, for example, those between 2 to 10 times the theoretical Faraday current necessary to move the mass ionic flow of catalyst species electrochemically towards the electrode. The minimum operating current required is a function of the design of the separation cell also. The use of more than a single separation chamber in series can significantly decrease the operating current required. For example, where a current of 4 times theoretical may be required for a single pass design such as the cell FIG. 1, a current of only 2 times theoretical may be required for a two pass design as illustrated by FIG. 2.

The residence time the polyol feed solution in the ion exchange compartment should be sufficient to reduce the concentration of the ionic impurity to a concentration of the ionic impurity to a concentration of less than about 10 part per million, preferably less than about 5 part per million, and more preferably less than about 1 part per million.

The efficient transport of the ionic impurity in the polyol to the surface of the ion exchange membrane is a function of the velocity of polyol through the ion exchange medium, which depends on the flow rate. Overall removal efficiency is strongly affected by the total path length of the ion exchange medium. For example, to achieve overall ionic impurity removal efficiencies above 99.9%, the path length should be from about 25 to about 75 centimeters. Longer or shorter path lengths may be employed if desired.

The process of the invention can be operated at temperatures and pressures compatible with materials of construction for all components, including plastics, ion exchange medium, and ion exchange membranes. Suitable operating temperatures are in the range of from about 10° C. to about 120° C., and preferably at from about 40° C. to about 90° C.

Operating pressure will vary, for instance, with the viscosity of the polyol, as a lower viscosity polyol will require a lower operating pressure at a selected flow rate. Suitable operating pressures include those in the range of from about 2 to about 100 psig, and preferably at from about 5 to about 80 psig. In addition, the electrode compartments may be pressurized to reduce the pressure differential across the ion exchange membranes and thus reduce stress on the membranes as this is believed to extend the life of the ion exchange membranes.

When the cathode compartment is filled with a cation exchange medium, the medium acts as the counter-ion electrolyte receiving the $OH^-$ ions from the following reaction at the surface of a cathode:

$$2 H_2O + 2e^- \rightarrow H_2 + 2OH^-$$

The metal cations coming across the adjacent cation membrane thus produce MOH in the cathode compartment. The MOH in the compartment would then increase in concentration as $M^+$ is removed from the polyol stream. Deionized water is preferably pumped into the cathode compartment to recover the MOH for re-use as a catalyst in the polyol manufacturing process. Water transport with the $M+$ ions is also occurring and adds water volume to the cathode compartment. While the cathode compartment is preferably filled with an ion exchange medium, the ion exchange medium need not be present. The cathode can be in direct contact with the ion exchange membrane separating the cathode compartment from the ion exchange compartment to reduce the cell voltage and prevent possible contamination of the recovered alkaline catalyst by monomers released from the ion exchange medium in the ion exchange compartment. The hydrogen generated can be recovered or vented.

The anode compartment must contain an anolyte to accept the $H^+$ ions generated at the surface of the anode and transport them to the membrane separating the anode compartment from an ion exchange compartment containing polyol. The anolyte may be an acid such as sulfuric, nitric, or phosphoric, or an acid-form ion exchange medium. In the latter case, a 100% $H^+$ form cation resin, for example, (Rohm & Haas IR-120+) can be used. The cation resin also provides physical support of the membrane against the pressure of polyol in the central ion-exchange chamber. The cation resin acts as the counter ion for the $H^+$ ions produced at the surface of the anode by splitting water as follows:

$$2H_2O \rightarrow O_2 + 4H^+ + 4e^-$$

The $H^+$ ions leaving the anode compartment pass through an adjacent cation membrane and are used to displace or drive the accumulated $M^+$ ions in the cation medium in the ion exchange compartments. Water from the anode compartment is lost with the transfer of $H^+$ ions from the compartment and from electrolysis. Deionized water may be added to the anode compartment periodically. In a preferred embodiment, the anode compartment can be made electrically common to two ion exchange compartments to reduce the number of anode compartments required and thus capital costs. The anode compartment may be filled with either an aqueous acid or a cation exchange medium in the acid form. When employing an aqueous acid anolyte, the anode compartment may be pressurized to balance the pressure of the polyol in the ion exchange compartment. The anode can be in direct contact with the ion exchange membrane separating the anode compartment from the ion exchange compartment to reduce the cell voltage. In this case, deionized water can be used as the anolyte. The oxygen generated is disengaged and recovered or vented to the atmosphere.

The ion exchange compartments between the anode and the cathode compartments are physically separated from each other by ion exchange membranes. The functional groups of the ion exchange membranes are of the same type i.e. cationic or anionic as the ionic charge of the impurity. The novel process of the present invention does not employ combinations of anion exchange membranes with cation exchange mediums, and vice versa, and thus are energy efficient and achieve high Io efficiencies in impurity removal. The number of ion exchange compartments employed depends on several factors including the operating pressure and performance. To operate the purification process continuously, the ion exchange medium is supplied with a regenerating ion, either hydrogen or hydroxyl ion. In one embodiment, where the ion exchange medium includes hydroxyl ions at the interface between the ion exchange medium and a cation exchange membrane, moisture present is electrolyzed or "water split" and the hydroxyl groups produced renew the ion exchange medium while hydrogen ions produced pass into the cathode compartment.

Figure 1:
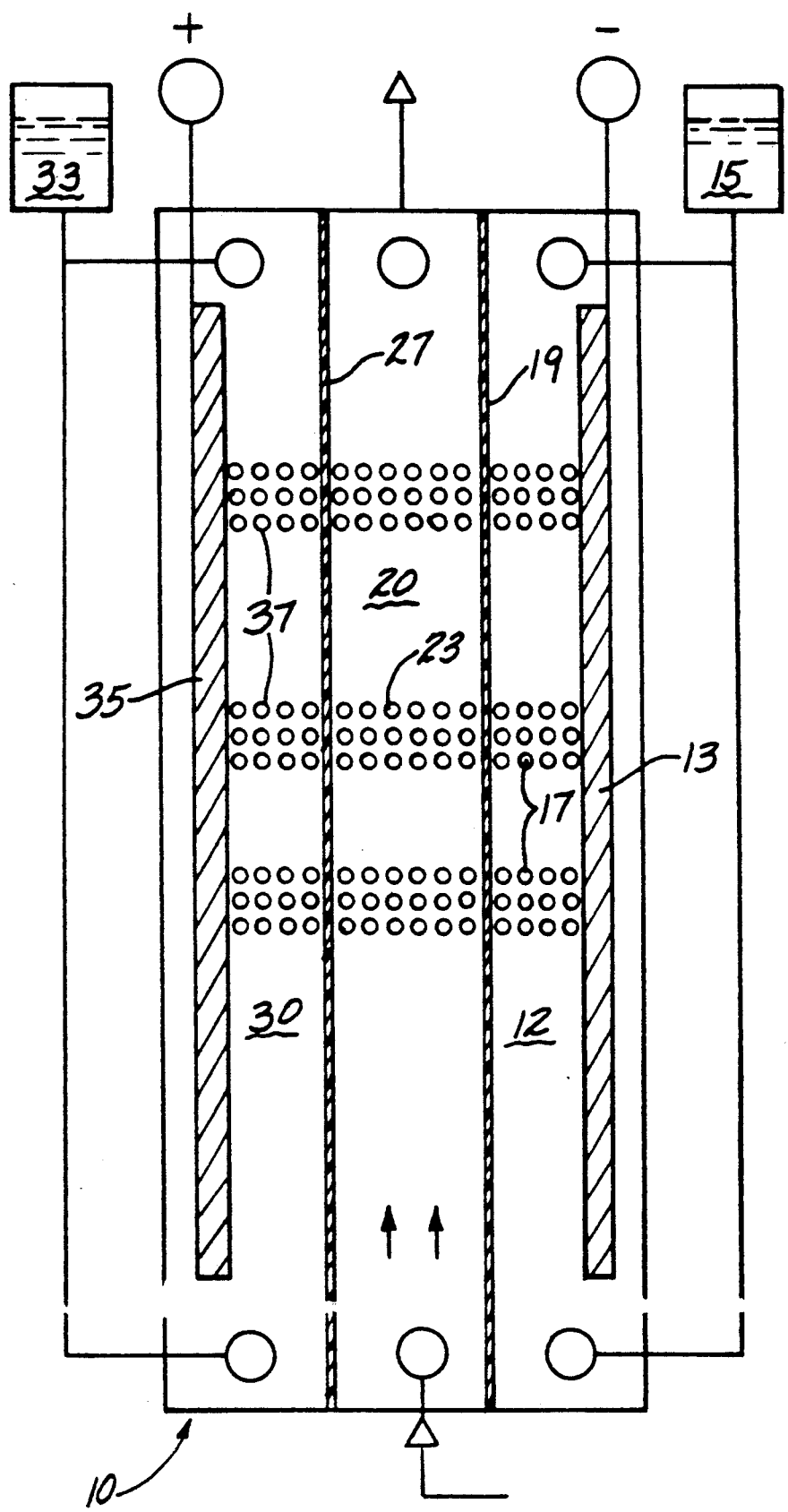
FIG. 1 is a sectional side elevational view of an electrolytic cell which can be employed in the novel process of the invention.
Figure 2:
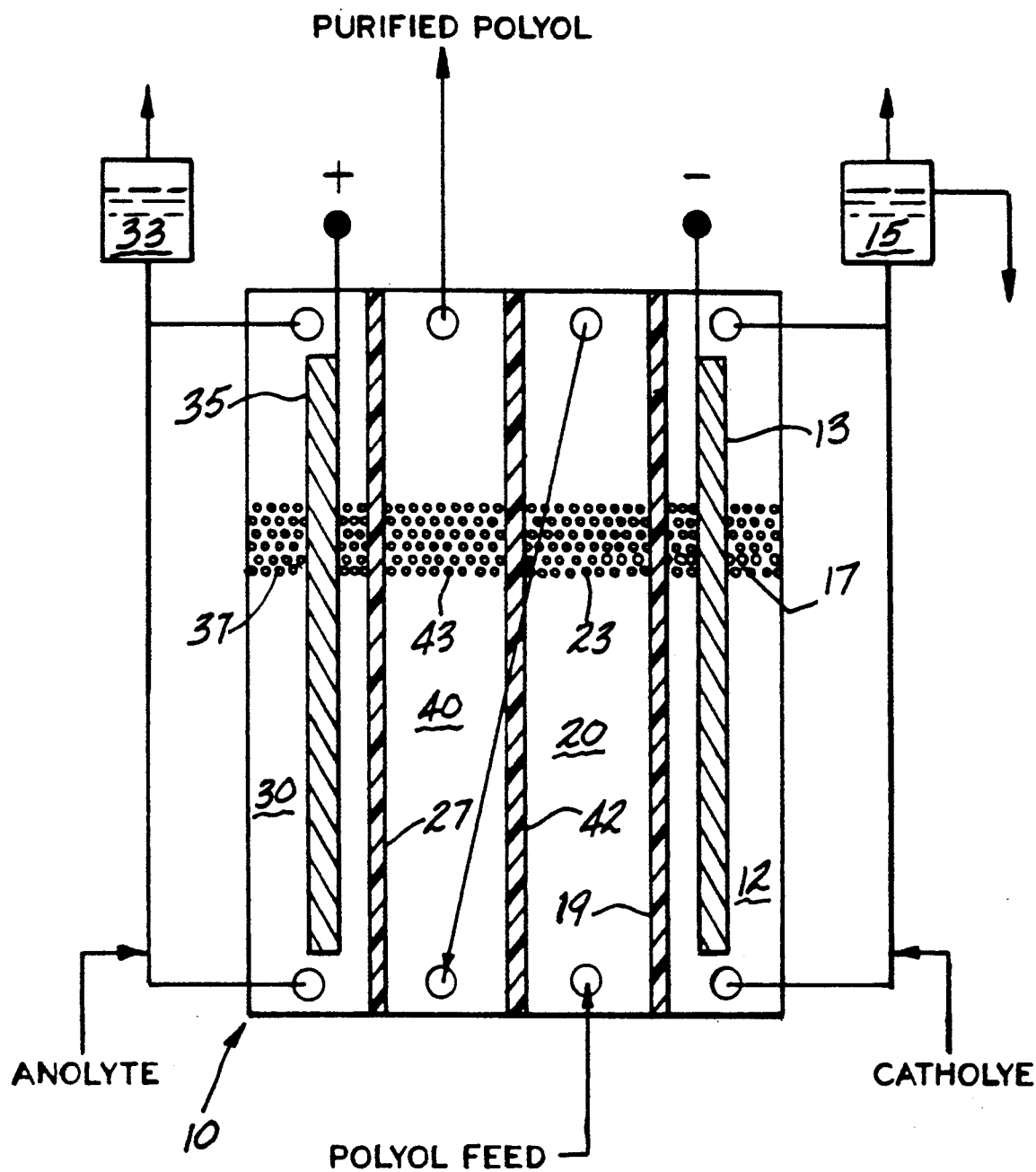
FIG. 2 is a sectional side elevational view of an alternate embodiment of an electrolytic cell which can be employed in the novel process of the invention.

FIGS. 1 and 2 illustrate embodiments where an ion exchange medium is present in the anode and cathode compartments. Where this is the case, deionized water may be fed as the electrolyte to the electrode compartment. When the ion exchange medium is not present in the electrode compartment, any suitable electrolyte may be used.

The novel process of the present invention may be used, for example, to remove ionizable impurities from non-aqueous fluids, recover ionic catalysts or other additives from process streams or products, and efficiently concentrate or further react ionizable components. Significant increases in treatment rates are achieved while obtaining high efficiencies in impurity removal. The process of the invention can be operated without producing solid wastes and without solids handling being required. Continuous regeneration of the ion exchange medium is carried out and the process can be operated at substantially full automation which permits significant reductions in labor costs.

The purified non-aqueous liquid product produced by the process of the invention may require additional treatments, for example, to alter the acidity or to reduce the number of color bodies. These improvements can be accomplished in several ways, one method being to contact the purified non-aqueous liquid product with selected ion exchange resins which remove color bodies and which alter the pH of the liquid. Another process passes the purified non-aqueous liquid product through a second separation cell containing ion exchange membranes of the opposite polarity or charge from the ion exchange medium used in purification in the ion exchange compartments to alter the acidity of the final product.

The following examples illustrate the process of the present invention without any intention of being limited thereby. All parts and percentages are by weight unless otherwise indicated.

EXAMPLE 1

Purification of Air

Compressed air containing 0.02 percent $CO_2$ and saturated with moisture was passed through chamber 2, of an apparatus illustrated by FIG. 1, at a flow rate of 1 liter per minute. Chamber 20 contained beads of a strong base-type anion exchange resin (IONAC® A-642, Sybron Chemicals Inc, Birmingham, N.J.) containing hydroxyl groups as the anion and was enclosed by anion exchange membranes (Tokuyama Soda ACLE-5P, obtained through NISSO IWAI, New York City, N.Y.). An electric current was passed between the anode and cathode at a rate of 0.16 amperes and 30 volts. Bicarbonate and carbonate ions formed passed into the anode compartment containing particles of a cation exchange resin (AMBERLITE® IR-120+, sodium form, Rohm & Haas Co.) and was converted to a gas containing $CO_2$ and $O_2$. The gas from the anode compartment was collected and absorbed in barium hydroxide. Purified air from chamber 20 was passed through a second barium hydroxide solution and the residual $CO_2$ concentration determined to be less than 1 part per million. A sodium hydroxide solution in the cathode compartment was electrolyzed and hydroxyl ions passed through an anion exchange membrane to chamber 20.

EXAMPLE 2

Purification of a Polyether Polyol

A separation cell of the type of FIG. 1 was constructed having an anolyte compartment, a central flow compartment, and a catholyte compartment. The anolyte compartment contained a titanium mesh anode having an oxygen-evolving anode coating (ENGLEHARD PCMA 1500, Englehard Minerals & Chemical Corp., N.J.) and was filled with a strong acid cation exchange resins (AMBERLITE® IR-120+, Rohm & Haas Co.) which had been converted to hydrogen form. The cathode compartment contained a stainless steel perforated plate cathode and was filled with a strong acid cation exchange resin (AMBERLITE® IR-120+, Rohm & Haas Co.) which had been converted to the sodium form. The central flow compartment was filled with a strong acid cation resin (AMBERLITE® IR-118, Rohm & Haas Co.) in the hydrogen form. The central flow compartment was separated from the anode compartment and the cathode compartment by a cation exchange membrane (Tokuyama Soda C-6610F). A crude diol polyether polyol (POLY-G® 20-56, Olin Corp.), which had been stripped of propylene oxide, contained 690 ppm of potassium ion catalyst (as 0.099 percent KOH). To the polyol was added deionized water to prepare a polyol feed solution containing 8 percent by weight of water. A current of 5.0 amperes was applied between the anode and the cathode of the cell. The polyol feed solution, at a temperature of 22° C., was pumped into the central flow compartment at a mass flow rate of 21.5 grams per minute. The purified polyol feed solution, at a temperature of 32°–33° C., was sampled for potassium ion concentration. The samples were diluted in methanol and analyzed by flame atomic absorption. The cell was operated for four hours. The results are given in TABLE I below.

TABLE 1

| Time in Run (Hrs) | Cell Current (Amperes) | Cell Voltage (Volts) | Polyol Feed Rate (gm/min) | Sample pH (in Methanol H$_2$O) | AA Analysis | | K+ % Reduction | Na+ % Reduction |
|---|---|---|---|---|---|---|---|---|
| | | | | | K+ PPM | Na+ PPM | | |
| 0 | 5.00 | 7.68 | 21.5 | — | 690.00 | 25.70 | — | — |
| 0.5 | 5.00 | 6.98 | 21.5 | — | 4.21 | 2.50 | 99.4% | 90.3% |
| 1.0 | 5.00 | 6.94 | 21.4 | — | 3.63 | 0.95 | 99.5% | 96.3% |
| 1.5 | 5.00 | 6.90 | 21.5 | 4.96 | 3.57 | 0.78 | 99.5% | 97.0% |
| 2.0 | 5.00 | 6.83 | 21.5 | 5.09 | 3.53 | 0.71 | 99.5% | 97.2% |
| 2.5 | 5.00 | 6.79 | 21.5 | 4.92 | 3.66 | 0.68 | 99.5% | 97.4% |
| 3.0 | 5.00 | 6.76 | 21.5 | 4.94 | 3.46 | 0.61 | 99.5% | 97.6% |
| 3.5 | 5.00 | 6.77 | 21.5 | 4.90 | 3.86 | 0.72 | 99.4% | 97.2% |
| 4.0 | 5.00 | 6.76 | 21.5 | 4.91 | 1.65 | 0.42 | 99.8% | 98.4% |

EXAMPLE 3

In the process of Example 2, the cell current was increased to 8 amperes and the cell operated for 0.5 hours. The potassium ion concentration declined to about 2.16 ppm indicating a 99.7 percent reduction in potassium ion. The temperature of the purified polyol solution increased to 45° C. at the higher operating current.

EXAMPLE 4

The process of Example 2 was operated by recycling 900 mls. of the purified polyol feed solution obtained from Example 2 through the central flow compartment. After two recycle passes through the cell (current: 5 amps) the potassium ion concentration in the polyol product was non-detectable by flame atomic absorption analysis.

EXAMPLE 5

A separation cell of the type of FIG. 2 was constructed having two ion exchange compartments between the anolyte and catholyte chambers. The anolyte compartment contained a titanium mesh anode having an oxygen-evolving anode coating (ENGLEHARD PCMA 1500, Englehard Minerals & Chemical Corp., N.J.) and was filled with a strong acid cation exchange resins (AMBERLITE ® IR-120+, Rohm & Haas Co.) which had been converted to hydrogen form. The cathode compartment contained a stainless steel perforated plate cathode and was filled with a strong acid cation exchange resin (AMBERLITE ® IR-120+, Rohm & Haas Co.) which had been converted to the sodium form. The ion exchange compartments were filled with a strong acid cation resin (AMBERLITE ® IR-118, Rohm & Haas Co.) in the hydrogen form. High temperature resistant perfluorosulfonic acid type cation membranes separated the compartments (NAFION ® 417, E. I. duPont de Nemours & Co., Wilmington, Del.). The flow pattern of the ion exchange compartments was arranged in a series flow arrangement. The polyol feed first entered into the bottom of the far right ion exchange compartment adjacent to the cathode compartment. The output of this compartment then flowed into the bottom of the left adjacent ion exchange compartment (which is adjacent to the anolyte compartment) and exited from the top of this compartment. The pilot cell catholyte and anolyte compartments had internal dimensions of 16.5 inches in height, 5.875 inches in width, and 1 inch thickness. The two ion exchange compartments had the same internal dimensions except that two compartment frames were used to double the compartment bed thickness to 2 inches.

The crude polyether feed (POLY-G ® 20-56, Olin Corporation, was adjusted to an 8% by weight water content by the addition of deionized water. The polyol feed was heated and stirred to a temperature near 60° C. before being pumped into the cell. The polyol feed contained 630 ppm of potassium ion catalyst as measured by flame atomic absorption in methanol. The sodium ion content of the feed was 10.50 ppm. By HCl titration, the polyol contained about 0.091% of alkaline catalyst as KOH equivalent. The cell was preconditioned with a deionized water feed at a constant applied current of 10 amperes before polyol was pumped into the cell at a beginning mass flowrate of 45.0 gm/min. The purified polyol output from the cell was sampled versus time and analyzed, after dilution in methanol, for potassium and sodium by flame atomic absorption. The purified polyol pH was measured by dissolving about 5 gm of sample in 30 ml of methanol and diluting the solvent mixture to a volume of about 100 ml with deionized water.

The polyol product from the cell showed significantly less than 1 ppm of potassium ion content for a 99.97% or better removal efficiency at mass flowrates of 45.0, 112.0, 208.0, and 225.0 gm/min during the run. The sodium content was also significantly less than 1 ppm for a 99.24% or better removal efficiency. The results are given in Table II below.

TABLE II

| Time in Run (Hrs) | Cell Current (Amperes) | Cell Voltage (Volts) | Polyol Feed Rate (gm/min) | Poly Feed Temp (°C.) | Polyol Product Temp. (°C.) | Cell Pressure Drop in PSIG | Product Sample pH (in Methanol /H2O) | AA Analysis K+ PPM | AA Analysis Na+ PPM | % Reduction in K+ | % Reduction in Na+ |
|---|---|---|---|---|---|---|---|---|---|---|---|
| 0 | 10.0 | 9.36 | 45.0 | 57.7 | — | 2.0 | — | 630 | 10.5 | — | — |
| 1.0 | 10.0 | 10.36 | 45.0 | 60.7 | 42.0 | 15.0 | 5.00 | 0.14 | 0.05 | 99.98% | 99.52% |
| 1.5 | 10.0 | 10.00 | 45.0 | 60.8 | 44.0 | 15.0 | 4.90 | 0.09 | 0.01 | 99.99% | 99.90% |
| Flowrate increased to 112 gm/min at 1.5 hours into the run. | | | | | | | | | | | |
| 2.0 | 10.0 | 9.11 | 112.0 | 60.5 | 49.0 | 26.0 | 4.50 | 0.18 | 0.07 | 99.97% | 99.33% |
| 2.5 | 10.0 | 8.80 | 112.0 | 60.0 | 48.0 | 26.0 | 4.33 | 0.22 | 0.08 | 99.97% | 99.24% |
| 3.0 | 10.0 | 8.75 | 112.0 | 60.2 | 48.0 | 25.0 | 4.43 | 0.26 | 0.01 | 99.96% | 99.90% |
| Flowrate increased to 208 gm/min at 3.0 hours into the run. | | | | | | | | | | | |
| 3.5 | 10.0 | 8.60 | 208.0 | 60.4 | 52.0 | 48.0 | 4.33 | 0.18 | <0.1 | 99.97% | 100% |
| 4.0 | 10.0 | 8.64 | 208.0 | 60.3 | 54.0 | 49.0 | 4.33 | 0.24 | <0.1 | 99.96% | 100% |
| Flowrate increased to 255 gm/min at 4.0 hours into the run. | | | | | | | | | | | |
| 4.5 | 10.0 | 8.60 | 225.0 | 60.0 | 55.0 | 55.0 | 4.34 | 0.15 | <0.1 | 99.98% | 100% |

EXAMPLE 6

The separation cell of Example 5 was modified by removing the second ion exchange compartment to a cell of the type of FIG. 1 having a single ion exchange compartment between the anolyte and catholyte chambers. The polyol feed entered into the bottom of the ion exchange compartment and exited from the top of this compartment.

The crude polyether feed (POLY-G ® 20-56, Olin Corporation, was adjusted to an 8% by weight water content by the addition of deionized water. The polyol feed was heated and stirred initially to a temperature near 60° C. before being pumped into the cell. The polyol feed contained 1400 ppm of potassium ion catalyst. The purified polyol output at various flow rates from the cell was sampled versus time and analyzed for total potassium and sodium by flame atomic absorption. The purified polyol pH was measured by dissolving about 10 gm of sample in 100 ml of an isopropanol/ water solvent mixture.

The polyol product from the cell showed significantly less than 1 ppm of potassium ion and sodium ion combined. The results are given in Table III below.

TABLE III

| Time in Run (Hrs) | Cell Current (Amperes) | Cell Pressure Drop in PSIG | Polyol Feed* Rate (g/min) | Sample pH (in Isopropanol/$H_2O$) | AA Analysis $K^+$ & $Na^+$ PPM | Temp. (C.) |
| --- | --- | --- | --- | --- | --- | --- |
| 0 | 13.00 | — | 177 | 4.7 | 1400 | — |
| 1.0 | 13.00 | 35 | 177 | 4.7 | 0.4 | 85.6 |
| 2.0 | 08.00 | 60 | 106 | 4.9 | 0.4 | 65.0 |
| 3.0 | 08.00 | 55 | 191 | 4.8 | 0.2 | 65.6 |
| 4.0 | 13.00 | 30 | 110 | 4.9 | 0.4 | 86.1 |
| 5.0 | 13.00 | 35 | 115 | 4.8 | 0.4 | 64.4 |
| 6.0 | 08.00 | 40 | 189 | 4.7 | 0.4 | 84.4 |
| 7.0 | 08.00 | 50 | 099 | 4.6 | 0.3 | 85.0 |
| 8.0 | 13.00 | 40 | 200 | 4.7 | 0.3 | 63.9 |

*Olin poly G ® 20-56 containing 8% $H_2O$

EXAMPLES 7-12

Post Treatment for Color and Acid Removal

Crude PolyG® 20-56 containing 1500 ppm KOH was exposed to air which increased the color bodies. This material was subsequently treated in the separation cell of the type of FIG. 1. After treatment, the polyol contained 0.4 ppm Na and K and had a pH of 5.2, an acid number of 0.087 and a color of 30 APHA. In a series of post treatments, this polyol was passed through a 200 ML bed volume of Rohm & Haas's ion exchange resins IRA-68 and IRA-35 at varying flow rates in the range of 15-50 bed volume per hour. The resulting polyol had significantly lower color bodies (10-15 APHA) and lower acid number (0.035 to 0.045) while there was a slight increase in pH and Na and K level. The results are given in Table III below.

TABLE III

COLOR AND ACID REMOVAL FROM EFS TREATED POLY G ™ 20-56

| Example No | Acid No. | APHA[3] Color | pH | PPM Na & K | CPR[4] | Bed Volumes/hr | |
| --- | --- | --- | --- | --- | --- | --- | --- |
| | | | | | | Flow Rate | Resin Used |
| Feed | 0.087 | 30 | 5.2 | 0.4 | 0.01 | | |
| 7 | 0.035 | 10 | 5.5 | 0.2 | 0.32 | 15 | IRA-68 |
| 8 | 0.040 | 10 | 5.2 | 0.2 | 0.24 | 45 | IRA-68 |
| 9 | 0.035 | 10 | 5.8 | 0.4 | 0.01 | 15 | IRA-68 |
| 10 | 0.045 | 10 | 5.2 | 1.2 | 0.63 | 50 | IRA-68 |
| 11 | 0.045 | 15 | 5.4 | 1.0 | 0.13 | 45 | IRA-35 |
| 12 | 0.040 | 10 | 5.5 | 2.0 | 0.29 | 15 | IRA-35 |

NOTES:
1. The resin was washed thoroughly before used.
2. The samples were filtered after the water was stripped
3. American Public Health Association
4. Controlled polymerization rate values

What is claimed is:

1. A process for removing a strongly ionic metallic impurity from an impure polyol which comprises:
   a) passing the impure polyol through at least one ion exchange compartment containing an ion exchange medium, the ion exchange compartment being separated from an anode compartment and a cathode compartment by ion exchange membranes, the ion exchange membranes and ion exchange medium having functional groups of the opposite charge as that of said strongly ionic metallic impurity,
   b) conducting an electric current across the ion exchange compartment substantially transverse to the direction of flow of the impure polyol, and
   c) transporting the strongly ionic metallic impurity through an ion exchange membrane to separate said strongly ionic metallic impurity from the polyol.

2. The process of claim 1 in which the ion exchange compartment contains a solid ion exchange medium.

3. The process of claim 2 in which the ion exchange medium is a resin.

4. The process of claim 2 in which the ionic impurity is a cation.

5. The process of claim 4 in which the polyol is a polyester polyol or a polyether polyol.

6. The process of claim 5 in which said strongly ionic metallic impurity is an alkali metal ion.

7. The process of claim 1 in which the ion exchange compartment is maintained at a temperature in the range of from about 10° to about 120° C.

8. The process of claim 1 in which said electrical current is at a current density of from about 0.1 to about 10 $KA/m^2$.

9. The process of claim 1 in which said anode compartment contains a non-oxidizable acid as an anolyte.

10. The process of claim 1 in which said anode compartment contains an ion exchange medium.

11. The process of claim 1 in which said cathode compartment contains an ion exchange medium.

12. The process of claim 11 in which said ion compartment medium is cationic.

13. The process of claim 1 in which said non-aqueous polyol is passed through a second ion exchange compartment adjacent to and separated from the ion exchange compartment by an ion exchange membrane.

14. The process of claim 10 in which said ion exchange resin is in the acid form.

15. The process of claim 14 in which water is added to said anode compartment.

16. The process of claim 1 in which water is added to polyol.

17. The process of claim 5 in which said polyol is a polyether polyol.

18. The process of claim 4 in which said strongly ionic metallic impurity is selected from the group consisting of sodium, potassium and mixtures thereof.

19. The process of claim 1 in which said strongly ionic metallic impurity is anionic.

20. The process of claim 1 in which purified polyol is removed from the ion exchange compartment and contacted with an ion exchange resin to alter the acidity of the purified polyol.

21. The process of claim 1 in which purified polyol is removed from the ion exchange compartment and contacted with a color removing agent.

22. A process for removing a cationic impurity from an impure polyol which comprises:
   a) passing said impure polyol through at least one ion exchange compartment containing a cation exchange medium, said ion exchange compartment being separated from an anode compartment and a cathode compartment by cation exchange membranes,
   b) conducting an electric current across the ion exchange compartment substantially transverse to the direction of flow of the impure polyol liquid, and
   c) transporting said cationic impurity through a cation exchange membrane to separate the ionic impurity from the polyol.

23. The process of claim 22 in which said polyol non-aqueous liquid is a polyester polyol or a polyether polyol.

24. The process of claim 23 in which said ionic impurity is an alkali metal ion.

25. The process of claim 24 in which the ion exchange compartment is maintained at a temperature in the range of from about 10° to about 120° C.

* * * * *